United States Patent Office 2,917,379
Patented Dec. 15, 1959

2,917,379

PROCESS FOR PREPARING PROPELLANT POWDER

Don W. Ryker, Alton, Ill., assignor to Olin Mathieson Chemical Corporation, a corporation of Virginia No Drawing. Application April 11, 1951
Serial No. 220,530

7 Claims. (Cl. 52—20)

This invention relates to the manufacture of propellent explosive and more particularly to the production of extruded powder grains.

Conventional methods of producing extruded powder grains for use in ammunition in small arms and cannons has ordinarily involved colloiding the nitrocellulose base with a volatile solvent mixture to form an extrudable dough. Such methods involved elaborate and costly technique for removing the volatile solvent from the extruded powder grains. In the manufacture of giant grains, for instance several inches in diameter and over a foot long such as are used for rocket powder, gelatinization of the nitrocellulose was effected by colloiding on heated rolls with frequent intermediate kneading operations. The resulting sheet or carpet of explosive was then rolled into a bundle and inserted in the extruding die. Such a process has the disadvantage that huge presses, rolls, and other explosive treating equipment capable of producing extremely high pressures are required, and the operation is, at best, very slow and hazardous, requiring many precautions to avoid explosion during the colloiding process. Furthermore, when the composition contains nitroglycerine, considerable nitroglycerine may be lost by volatilization during the extensive rolling and kneading resulting in variations in composition of the ultimate grains. Further disadvantages are that the process is batch-wise resulting in considerable down time for the equipment, and a large quantity of scrap is produced, since the last material from each individual carpet roll that is extruded and the first of the next roll are not usable.

The present invention has as an object the provision of a simplified and improved process for manufacturing extruded powder grains whereby the aforementioned and other disadvantages of prior extruding processes are overcome. Another object of this invention is to provide a process for producing extruded powder grains of either single or double base composition in which volatile solvents and the use of rolling, kneading, and other high pressure mixing methods and devices are eliminated. A further object is to provide an improved process for extruding powder grains of any desired size, and particularly suited for the production of grains of rocket powder size.

The foregoing objects and advantages as well as others which will become apparent from the following detailed description, are accomplished in accordance with this invention, generally stated, by providing particles or pellets of a propellant, uniformly mixing therewith a plastisol solvent in a sufficient amount to provide a pourable and flowable paste, heating the paste to an elevated temperature to cause the plastisol solvent to dissolve the propellant, extruding the heated mass through a die in a continuous piece and subdividing the extruded piece or rod into the desired lengths for powder grains. The elevated temperature hastens the solution of the propellant and facilitates the extrusion of the mixture. By "plastisol solvent" as used herein is meant a relatively non-volatile liquid which is a slow acting solvent or one having only little or no solvent powder for the particles of propellant at low or ordinary room temperatures, but being rapidly acting and having a relatively great solvent power therefor at elevated temperatures.

It has been found that the particles of propellant are advantageously formed by agitating nitrocellulose and a solvent therefor, such as ethyl acetate, with an excess of a non-solvent, such as water, in the presence of a protective colloid, removing the solvent, and thereafter drying the resulting pellets of nitrocellulose. Such a process is described in U.S. Patent 2,027,114 and for spherical pellets of high density in U.S. Patent 2,160,626. Such spheres are particularly advantageous in the present invention because of their inherent characteristic of being relatively free-flowing, even in the dry state, and because of their "case-hardened" surface characteristics which tends to resist initial attack by the solvent. This surface characteristic is undoubtedly the result of a "skin effect" occasioned by surface tension and removal of the solvent in the formation of the spheres. Other ingredients, such as dioctyl phthalate, lead stearate, red lead, centralite, carbon black, dinitrotoluene, and the like, may be incorporated with the nitrocellulose in the formation of the spherical pellets to obtain particular ballistic properties as desired. Using such spherical particles, a relatively free-flowing paste is obtained in accordance with this invention when the spheres are mixed with the proper proportion of the plastisol solvent, whereas if irregular shaped particles, such as may be obtained by merely grinding cannon powder or the like, are utilized, the desirable free-flowing characteristics of the paste are not obtained. Although the spheres of propellant may be of any desired size, large diameter spheres require relatively longer periods of time in order to effect their solution and resultant solidification of the grain, whereas with smaller spheres, the time is correspondingly reduced. It is preferred therefore to utilize spheres having a diameter not greater than about 0.005 inch and preferably of much smaller diameter, such as 0.001 inch or less.

The ordinary liquid detergents are generally solvents for nitrocellulose and are admirably suited as the plastisol solvent in the present process, it only being necessary that such deterrent be a relatively slow acting solvent for the propellant at ordinary room or low temperatures. In other words, the solvent power of such solvent should be insufficient to effect any substantial solution of the propellant at ordinary temperatures during the time required for uniformly mixing the solvent and propellant together. Furthermore, if it is desired to prepare double base rocket powder grains, energizing modifiers, such as a liquid explosive nitric ester of a polyhydric alcohol, for example, nitroglycerine, butane triol trinitrate, diglycol dinitrate, ethylene glycol dinitrate, and the like, may be mixed with one or more miscible deterrents, such as dibutyl phthalate, dimethyl sebacate, dibutyl succinate, dibutyl adipate, triacetin, ethyl diphenyl phosphate, tributyl phosphate, and the like, to provide plastisol solvents admirably suited for the purpose. If it is desired to produce single base rocket powder grains, the energizing modifier may be omitted from the composition and the plastisol solvent may be composed only of a liquid deterrent, such as one of those set forth above or mixtures of them. Other deterrents suitable therefor at temperatures above their melting point are dimethyl phthalate, dioctyl sebacate, ortho nitro biphenyl, butyl benzyl phthalate, octyl diphenyl phosphate, triethylene glycol di-2-ethyl butyrate (i.e. triglycol dihexoate), and the like.

The amount of plastisol solvent should be such that it forms at least about 25% of the volume of a mixture of the solvent and the propellant. Substantially lesser amounts of the plastisol solvent tend to result in voids or air pockets in the resulting rocket grain and the mixture with such lesser amounts is generally not sufficiently fluid for the purpose. Greater amounts of plastisol solvent may be utilized to good advantage to increase the fluidity of the mixture, vary the ballistic properties of the resulting rocket grain as desired, and insure absence of voids or air spaces in the grains, but the amount utilized should preferably not be sufficiently great to result in segregation or settling out of the propellant during the solution period at elevated temperature.

In operation, the plastisol solvent is preferably desiccated or otherwise treated to reduce any traces of moisture to a minimum, and both the propellant and plastisol solvent are preferably evacuated prior to mixing to an absolute pressure of about ten millimeters or less of mercury for several hours and then are intimately mixed in any suitable mixer, such as a Sigma blade mixer, while the pressure of about ten millimeters or less is maintained. Such precautions as desiccating and evacuating are preferably observed in order to minimize the possibility of undesirable voids in the resulting extruded powder grains. The resultant uniform mixture is then heated, preferably to a temperature in the range of about 50° C. to 90° C., for a period of time sufficient to cause solution of the propellant. As a general rule, the higher the temperature is raised during this treatment the shorter the period required for solution of the propellant and the less pressure required to subsequently force the mixture through the die, but precaution should be observed not to exceed the combustion or explosive temperature of the mixture. When the propellant is dissolved in the plastisol solvent, the hot mass is forced through an extrusion die to provide a length or rod of explosive, the piece being continuous as it comes from the die. The heating of the mixture may be accomplished by employing a heated worm or screw feeder for forcing the mixture through the die, with the period of dwell in the feeding device being sufficient to heat up the mixture and cause solution of the propellant. The extruded piece is then subdivided cutting into suitable lengths to form extruded powder grains, which are of uniform composition throughout.

In order that the invention may be further clarified, following is an example illustrating a typical embodiment of the invention. Two hundred fifty parts by weight of nitrocellulose having a nitrogen content of about 12.6% are agitated with 4100 parts of water at about 50° C. to form an aqueous slurry. A suspension of carbon black in ethyl acetate is separately prepared by first thoroughly mixing 0.705 part of carbon black with 100 parts of ethyl acetate. This mixture of carbon black and ethyl acetate is then added to 1250 parts more of ethyl acetate, and the resultant dilute carbon black-ethyl acetate mixture are agitated to insure uniform distribution of the suspended particles of carbon black. Thirty one and four-tenths parts of dinitrotoluene and 2.8 parts of ethyl centralite are then added to the carbon black-ethyl acetate mixture. When the dinitrotoluene and the ethyl centralite are dissolved, the resulting mixture is then added to the nitrocellulose slurry while the slurry is under agitation. The temperature is raised to 68° C. and the complete charge vigorously agitated for one hour at which time the nitrocellulose is dissolved. Twenty-five parts of a protective colloid of the type derived from animal protein dispersed in 150 parts of water is then added and the agitation is continued until the nitrocellulose solution is formed into globules of the desired small size. Vigorous agitation is required in order to form very small particles. The addition of an emulsifying agent, such as the water soluble salts of fatty acids, sulphonated oils, the so-called water-soluble oils, and the like, greatly facilitates the formation of small particles of the nitrocellulose solution, and for this reason, twenty-four parts of a 40% aqueous solution of the sodium sulphate derivative of 2-ethylhexanol is added to the bath. One hundred twenty-five parts of sodium sulfate dissolved in 300 parts of water is added over a one hour period and agitation continued for an additional three hours. The globules are then hardened to form powder grains by removal of the ethyl acetate during continuous agitation and heating up to about 99° C. in accordance with the practice set forth in U.S. Patent 2,027,114 referred to, hereinbefore. The resultant spherical pellets of propellant are then air dried at 50° C. and are composed of about 87.7% nitrocellulose, 11.0% dinitrotoluene, 0.3% carbon black, and 1.0% ethyl centralite and have an average diameter of about 0.001 inch, more or less, depending on the degree of agitation used in the formation thereof.

About 56.18 parts by weight of spherical pellets of propellant such as prepared by the foregoing treating steps are then placed in a Sigma blade mixer and the system is evacuated to an absolute pressure of about ten millimeters of mercury and so held for about sixteen hours. Meanwhile, about 37 parts by weight of a substantially anhydrous plastisol solvent, composed of 74% by weight nitroglycerine, 25% by weight dimethyl phthalate and 1% by weight ethyl centralite, is placed in a vessel and the vessel evacuated to an absolute pressure of about 10 millimeters of mercury and so maintained for about sixteen hours. The solvent is then added to the propellant in the mixer and the mixer operated to intimately mix the solvent and propellant, while the vacuum is maintained to prevent entrapment of air. Inasmuch as the plastisol solvent has a specific gravity of about 1.5, the percentage by volume of the plastisol solvent in the mixture is about 41.3%. After the solvent and propellant are uniformly mixed, the mixture is then carefully poured or otherwise fed into the heated worm or screw feed device, for example a "Moyno" pump, for passing the mixture through an extrusion die. The length of the screw feed device and the rate of discharging the mixture from the die are preferably so controlled that the mixture in traveling from one end of the screw to the other in its approach to the die is sufficiently heated to effect substantially complete solution of the propellant. It is thus possible to carry on the operation continuously. In order to accomplish this the screw feed mechanism is maintained at a temperature of about 75° to 85° C. with the rate of feeding thereto and discharge from the die being suitably controlled to permit solution of the propellant. The exact time of such heat treatment required may vary from a very few minutes up to several hours, and depends upon the activity of the solvent, the temperature of the mixture, the particle size of the propellant, and the effective resistance of the surface of the propellant grains, hereinbefore described as "case hardening," but in any event the mixture is maintained at elevated temperature for a sufficient length of time to effect a solution of the propellant and sufficient setting up of the mass to permit formation of the desired powder grains. As the gelatinized mass is extended from the die it is cut into powder grains of the desired length.

Extruded powder grains prepared in accordance with the foregoing example are of substantially uniform composition throughout the grain, and have the requisite strength and other desired physical properties. It will be apparent that the method is relatively simple lending itself to mass production and that no costly apparatus for developing high mixing pressures is needed. It will likewise be apparent that the propellant and plastisol solvent may vary appreciably in composition and that rocket powder grains having substantially any desired ballistic characteristics can be prepared in accordance with this invention. While the foregoing embodiment has been set forth in considerable detail, it is to be distinctly understood that many modifications and variations will naturally present themselves to those skilled in the

Having thus described the invention, what I claim and desire to secure by Letters Patent is:

1. In the art of making a powder grain, the process which comprises mixing fine particles of a gelatinized nitrocellulose propellant with a liquid plasticizer for the nitrocellulose selected from the group consisting of dibutyl phthalate, dimethyl sebacate, dibutyl succinate, dibutyl adipate, triacetin, ethyl diphenyl phosphate, tributyl phosphate, dimethyl phthalate, dioctyl sebacate, ortho nitro biphenyl, butyl benzyl phthalate, octyl diphenyl phosphate, and triethylene glycol di-2-ethyl butyrate and mixtures thereof with a liquid explosive nitric ester of a polyhydric alcohol to form a substantially uniform pourable paste, said plasticizer liquid explosive nitric ester of a polyhydric alcohol mixture being present in an amount greater than about 25% by volume of the resulting paste, and simultaneously extruding said paste through a die and heating to completely dissolve said propellant in the plasticizer and thus effect solidification of said paste into a substantially homogeneous mass as it emerges from said die.

2. In the art of making powder grains, the process which comprises preparing a substantially uniform pourable paste by mixing together particles of gelatinized nitrocellulose propellant and a liquid plasticizer for nitrocellulose in the amount of at least about 25 percent by volume of the resulting mixture and at a temperature at which the nitrocellulose is substantially insoluble, raising the temperature of the resulting paste to a point where said particles are completely dissolved and have formed a substantially homogeneous mass, and thereafter forcing the mass through an extrusion die.

3. In the art of making powder grains, the process which comprises preparing a substantially uniform pourable paste by mixing together particles of gelatinized nitrocellulose propellant and a liquid plasticizer for nitrocellulose in the amount of at least about 25 percent by volume of the resulting mixture and at a temperature at which the nitrocellulose is substantially insoluble, raising the temperature of the resulting paste to a point where said particles are completely dissolved and have formed a substantially homogeneous mass, extruding said heated mass as a continuous piece, and thereafter subdividing said extruded piece into powder grain lengths.

4. In the art of making powder grains, the process which comprises preparing a substantially uniform pourable paste by mixing together particles of gelatinized nitrocellulose propellant and a liquid plasticizer for nitrocellulose in the amount of at least about 25 percent by volume of the resulting mixture and at a temperature at which the nitrocellulose propellant is substantially insoluble in the plasticizer, and thereafter heating said paste to a temperature within the range of from about 50° C. to about 90° C. until the propellant particles have completely dissolved and formed a substantially homogeneous mass, and forcing the mass at said elevated temperature through an extrusion die.

5. In the art of making powder grains, the process which comprises preparing a substantially uniform pourable paste by mixing together particles of gelatinized nitrocellulose propellant and a liquid plasticizer for nitrocellulose in the amount of at least about 25 percent by volume of the resulting mixture and at a temperature at which the nitrocellulose propellant is substantially insoluble in the plasticizer, and thereafter simultaneously heating and extruding the paste through a suitable die at a temperature at which said particles completely dissolve in said plasticizer and the paste becomes solidified into a substantially homogeneous solid mass as it is forced through the die.

6. In the art of making powder grains, the process which comprises preparing a substantially uniform pourable paste by mixing together particles of gelatinized nitrocellulose propellant and a liquid plasticizer for nitrocellulose in the amount of at least about 25 percent by volume of the resulting mixture and at a temperature at which the nitrocellulose propellant is substantially insoluble in the plasticizer, said plasticizer including in its composition a liquid explosive nitric ester of a polyhydric alcohol, and thereafter heating said paste until the propellant particles have completely dissolved and formed a substantially homogeneous mass, and forcing the mass through an extrusion die.

7. In the art of making powder grains, the process which comprises preparing a substantially uniform pourable paste by mixing together particles of gelatinized nitrocellulose propellant having an average diameter of less than 0.005 inch and a liquid plasticizer for nitrocellulose in the amount of at least about 25 percent by volume of the resulting mixture and at a temperature at which the nitrocellulose propellant is substantially insoluble in the plasticizer, raising the temperature of the resulting paste to a point where said particles are completely dissolved and have formed a substantially homogeneous mass, and forcing the heated mass through an extrusion die.

References Cited in the file of this patent

UNITED STATES PATENTS

| | | |
|---|---|---|
| 2,027,114 | Olsen et al. | Jan. 7, 1936 |
| 2,160,626 | Schaefer | May 30, 1939 |
| 2,210,871 | Boddicker | Aug. 6, 1940 |
| 2,292,469 | Olsen | Aug. 11, 1942 |
| 2,401,236 | Fielitz | May 28, 1946 |
| 2,417,090 | Silk, et al. | Mar. 11, 1947 |

UNITED STATES PATENT OFFICE
CERTIFICATE OF CORRECTION

Patent No. 2,917,379

December 15, 1959

Don W. Ryker

It is hereby certified that error appears in the printed specification of the above numbered patent requiring correction and that the said Letters Patent should read as corrected below.

Column 2, line 42, for "detergents" read -- deterrents --; column 3, line 34, for "plastisal" read -- plastisol --; column 4, line 55, for "asufficient" read -- a sufficient --; line 59, for "extended" read -- extruded --.

Signed and sealed this 9th day of August 1960.

(SEAL)
Attest:

KARL H. AXLINE
Attesting Officer

ROBERT C. WATSON
Commissioner of Patents